United States Patent [19]

Screen

[11] Patent Number: 4,677,706

[45] Date of Patent: Jul. 7, 1987

[54] CASTOR BRAKE

[75] Inventor: Stafford T. Screen, Stourbridge, United Kingdom

[73] Assignee: Colson Castors (Europe) Limited, United Kingdom

[21] Appl. No.: 747,076

[22] Filed: Jun. 19, 1985

[30] Foreign Application Priority Data

Jun. 21, 1984 [GB] United Kingdom ................ 8415846

[51] Int. Cl.⁴ ............................................. B60B 33/00
[52] U.S. Cl. ........................................ 16/35 R; 16/47
[58] Field of Search ............................. 16/35, 45, 47; 188/1.12

[56] References Cited

U.S. PATENT DOCUMENTS

| 3,409,105 | 11/1968 | Clinton | 16/35 |
| 3,705,438 | 12/1972 | Strosberg et al. | 16/35 |
| 3,751,757 | 8/1973 | Strosberg et al. | 16/35 |
| 3,881,216 | 5/1975 | Fontana | 16/36 |
| 3,890,668 | 6/1975 | Strosberg et al. | 16/35 |
| 4,414,702 | 11/1983 | Neumann | 16/35 |

FOREIGN PATENT DOCUMENTS

| 1296763 | 6/1969 | Fed. Rep. of Germany | 16/35 R |
| 2419167 | 11/1975 | Fed. Rep. of Germany | 16/35 R |
| 2721375 | 11/1978 | Fed. Rep. of Germany | 16/35 R |
| 1172072 | 11/1969 | United Kingdom . | |
| 1331215 | 9/1973 | United Kingdom . | |
| 1467139 | 3/1977 | United Kingdom . | |
| 2057867 | 4/1981 | United Kingdom . | |
| 1592095 | 7/1981 | United Kingdom . | |
| 2093540 | 9/1982 | United Kingdom . | |
| 2119042 | 11/1983 | United Kingdom . | |
| 2127287 | 4/1984 | United Kingdom . | |
| 2132478 | 7/1984 | United Kingdom . | |

Primary Examiner—M. Jordan
Attorney, Agent, or Firm—Neuman, Williams, Anderson & Olson

[57] ABSTRACT

A single or twin wheel castor has a body (4,14; 90) journalling the wheel (92) or wheels (2) about a horizontal axis, with the body capable of swivelling on a mounting member (16) about a vertical axis spaced from the wheel axis. An operating member (25) is movable axially but non-rotatably by a cam (30) along the vertical axis between a lower position in which the body is held to the operating member and thus to the mounting member in a predetermined angular orientation, the whole being free to turn, an intermediate position in which the wheels are free to turn and the body is free to swivel and an upper position in which a wheel braking force is applied frictionally or mechanically by a brake lever (44, 105), the engagement of the operating member with the brake lever also holding the body in its angular position when the brake was applied.

18 Claims, 11 Drawing Figures

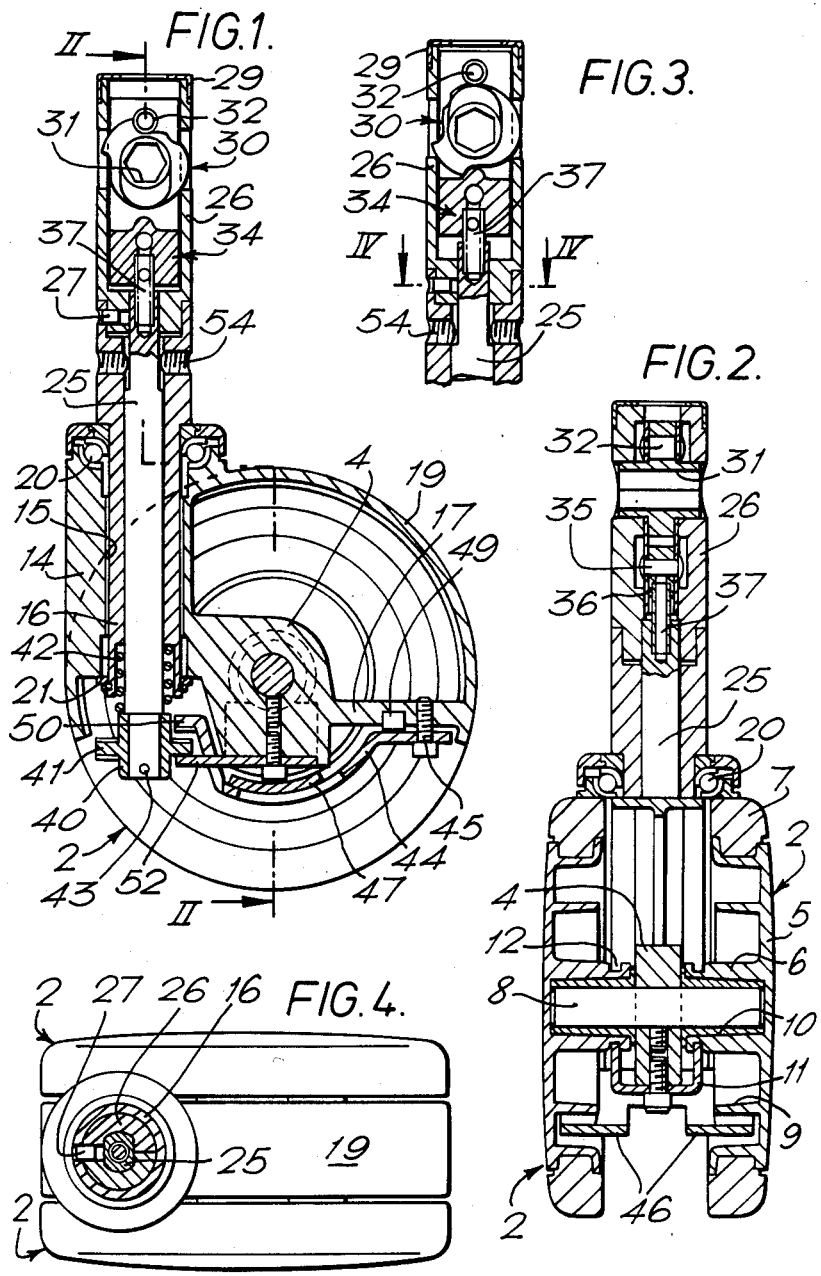

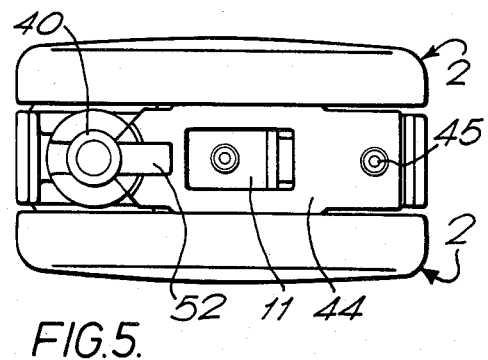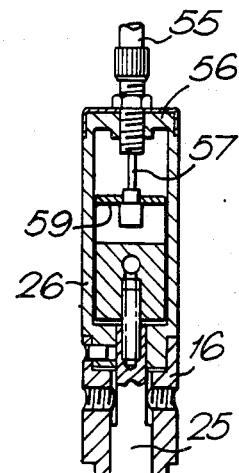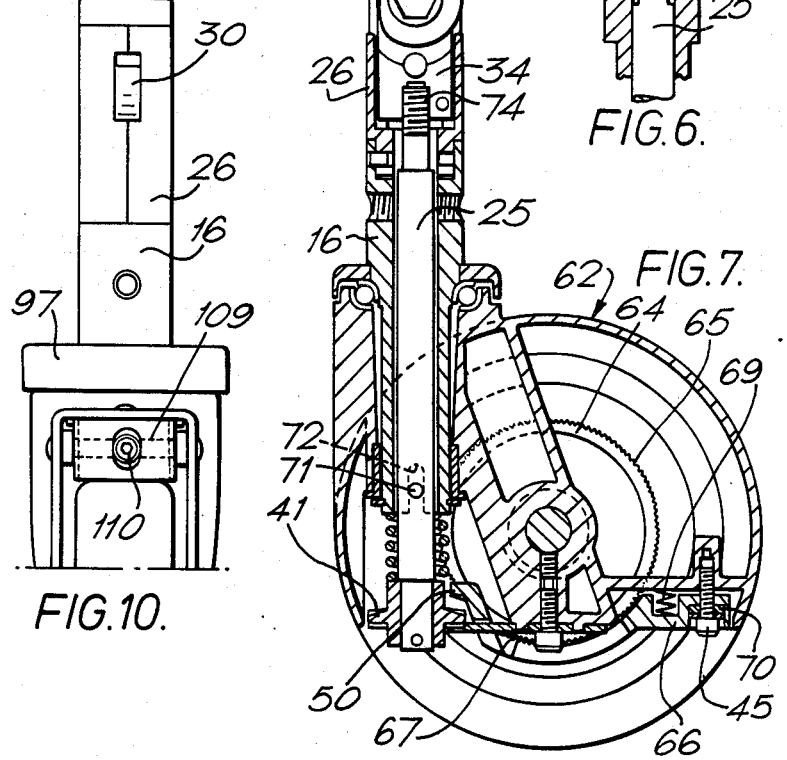

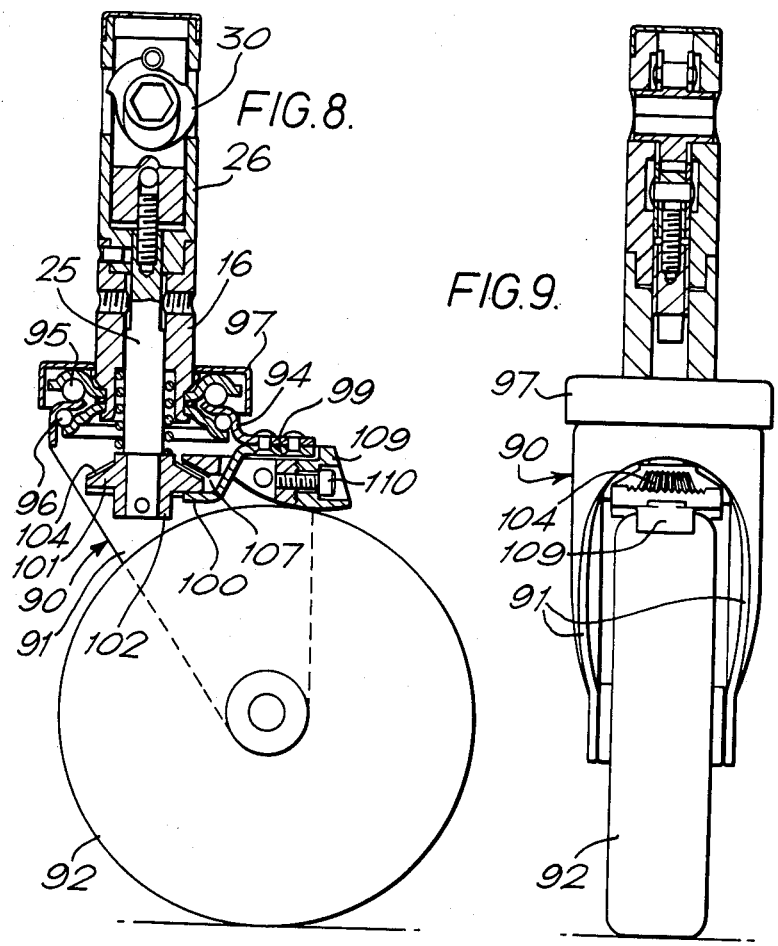
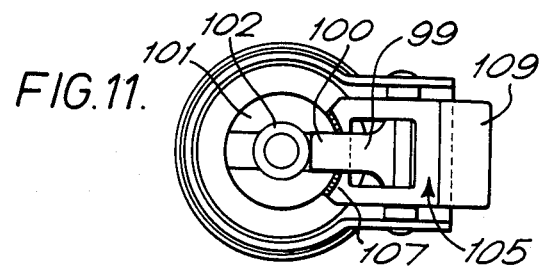

CASTOR BRAKE

FIELD OF THE INVENTION

The invention relates to castors and more particularly to castors incorporating braking means.

BACKGROUND OF THE INVENTION

There is known from United Kingdom Patent Specification GB No. 2 096 254 A a castor comprising a body mounting wheels for rotating about a rolling axis, an attachment member for mounting the body on an article, the body and attachment member being relatively movable about an upright swivelling axis spaced from the rolling axis, and a braking element movable downwardly along the swivelling axis to brake the wheels against rotation and to hold the body against the swivelling movement. The downward movement of the braking element to effect braking necessarily imposes on the castor forces which tend to separate its components parts, and it moreover presents difficulty in employing the castor for remote controlled braking as by a Bowden cable connection.

It is accordingly an object of the present invention to provide a castor in which braking forces are applied in a direction tending to urge the component parts thereof together.

It is also an object of the invention to provide a castor having wheel braking means suited to operation by way of a Bowden cable.

It is a further object of the invention to provide a castor having a braking element engageable with the wheels thereof to apply a braking force thereto, and an operating member linked with the braking element and movable upwardly to cause the braking force to be applied.

SUMMARY OF THE INVENTION

In accordance with the invention there is provided a castor comprising a body rotatably carrying at least one wheel, a mounting member on which the body is carried for rotation in use about a generally vertical axis spaced from the wheel axis, and a brake mechanism for braking the wheel against rotation, the brake mechanism including an operating member guided by the mounting structure for upward movement to exert a braking effect on the at least one wheel.

Because of the upward direction of movement of the operating member to effect braking, the forces acting in the castor during braking tend to hold the castor parts together rather than to urge them apart as occurs when an operating member has to be moved downwardly to apply braking pressure, as in conventional castor braking arrangements.

The operating member can be operable by means of a cam accommodated in the mounting structure, but the direction of movement of the brake operating member makes it readily possible to arrange for brake operation from locations remote from the castor, for example, by way of a Bowden cable connection, in a much more convenient way than is permitted by the conventional constructions.

The invention can be readily embodied in single wheel or twin wheeled castors in which the movement of the operating member to apply the braking force is arranged also to latch the body against swivelling about the vertical axis. Additionally, the operating member can be arranged to be movable to cause the body to be latched relative to the mounting structure in a predetermined angular orientation about the vertical axis, without wheel braking.

BRIEF DESCRIPTION OF THE DRAWINGS

FIG. 1 is a sectional side view of a twin-wheel castor embodying the invention;

FIG. 2 is a sectional front view of the castor taken on the line II—II of FIG. 1;

FIG. 3 is a fragmentary view corresponding to that of FIG. 1 of the upper part of the castor only, showing a different operating position;

FIG. 4 is a sectional plan view of the castor taken on line IV—IV of FIG. 3;

FIG. 5 is an underneath view of the castor;

FIG. 6 is a fragmentary view corresponding to Figyre 3 but showing a modified form of the castor of FIGS. 1-5;

FIG. 7 is a view corresponding to FIG. 1 but showing a second modified form of the castor of FIGS. 1-5;

FIG. 8 is a sectional side view of a single wheel castor embodying the invention;

FIG. 9 is a sectional front view of the castor of FIG. 8; and

FIG. 10 is a partial rear view of the castor of FIGS. 8 and 9; and

FIG. 11 is an underneath view of the castor of FIGS. 8-10 with the wheel removed.

The twin wheel castor shown in FIGS. 1-5 comprises a pair of like wheels 2 journalled on a body located between them. Each wheel comprises a slightly curved outer disc portion 5 from which there projects inwardly towards the body an inner hub 6, an outer rim shaped to receive a tyre 7, and a concentric intermediate brake sleeve portion 9. The body has a centre portion 4 with a transverse aperture in which a steel shaft 8 is secured by a grub screw. The wheel hubs 6 are journalled on the ends of the shaft 8 by way of bearings 10. A bolt received in the tapped hole containing the grub screw secures a channel member 11 to the body portion 4 and the free edges of the upwardly extending side webs of the channel member each engage in a groove 12 of a respective one of the wheel hubs 6 to retain the wheels 2 assembled with the body.

Forwardly of the body centre portion 4, an integrally formed front portion 14 has an upright circular cross-section bore 15 receiving a hollow stem 16 forming part of a mounting structure by which the castor can be mounted on an article of furniture. Between the upper end of the body front portion 14 and a downwardly facing step formed in the stem 16 there is received a bearing in the form of a ball bearing 20 accommodating swivelling of the body about the vertical axis of the stem and transmitting the load represented by the weight of the furniture article to the body and thus through the wheels to a floor on which they rest. The body is retained on the stem 16 by a washer and split collar connection 21 at the lower end of the stem. Projecting rearwardly from the body centre portion 4 is a rear portion 17 from the free end of which a cylindrical shell portion 19 extends to the body front portion 14. The shell portion 19 follows the outer periphery of the wheel tyres 7 and substantially fills the space between them.

A rod 25 received in the central bore of the stem 16 is longitudinally movable in the bore by means of a camming mechanism at the upper end of the stem from a free or normal position, in which the body is free to swivel and the wheels to turn, to positions in which the body is latched against swivelling, with or without braking of the wheels.

The cam mechanism is received within a cam housing 26 having a reduced diameter lower end portion received within the upper end of the stem 16, the assembly being secured together by a fastener 27, which can be advanced wholly into the housing 26 to effect disassembly. The housing 26 can comprise two semi-cylindrical halves held together by the stem 16 and a cap 29. The rod 25 extends into the housing 26 and has opposed flats, best seen in FIG. 4, engaged by the housing to hold the rod against rotation.

A cam member 30 has a hub portion 31 with an hexagonal internal cross-section extending transversely of the housing 26 into apertures in the housing wall. Inside the housing 26, the cam member has a peripheral surface made up of three cam faces one or other of which is engaged by a cam follower, which can take the form of a rivet or a roller 32, depending on the angular position of the cam member. The roller 32 is carried at the upper end of a yoke 34 having side plates joined together below the cam member by a fastener 35 with a fitting 36 between them. The yoke 34 is connected to the upper end of the rod 25 by a screw-threaded pin 37 engaging in opposed tapped holes in the fitting 36 and in the rod 25. Rotation of the pin 37 permits adjustment during assembly of the castor of the spacing of the yoke 34 and the rod 25 longitudinally of the mounting structure.

The lower end of the rod 25 extends below the stem 16 and has secured thereto by a cross pin 43 a sleeve 40 having a flange 41 provided with a mutliplicity of radially extending teeth on its upper surface and with a pair of diametrically opposed slots beneath. Between the upper end of the sleeve 40 and the floor of a recess opening up from the lower end of the stem 16 is trapped a compression spring 42 which holds the roller 32 into engagement with the cam faces of the cam member 30.

A brake arm 44 extends forwardly from beneath the rear portion 17 of the body, to which it is secured by a bolt 45, and has laterally projecting side portions 46 each of which extends beneath a respective one of the wheel braking sleeve 9 and is curved so as to be generally coaxially therewith. The upper surfaces of the side portions 46 carry brake pads 47 of suitable material, for example, a material of high frictional coefficient such as a good quality rubber. A resilient pad 49 is received between the rear portion of the brake arm 44 and the rear body portion 17. At the forward end, the side portions 46 merge into a toothed portion 50 which overlies the teeth on the upper side of the flange 41.

The centre web of the channel member 11 extends beyond the side webs forwardly through an aperture in the brake arm 44. Its free end 52 underlies, and can be received in, the slots provided at the underside of the flange 41. The forward end of the brake arm 44 rests on the end 52 to define the lowest position of the toothed portion 50 when the brake arm is inoperative.

The castor is installed for use for example by reception of the support structure within the hollow end of a furniture leg. The castor is held against rotation relative to the leg by fasteners extending through the leg into apertures 54 in the upper part of the stem 16. At least one aperture of the leg is aligned with the cam member 30 to permit an operating lever of hexagonal external cross-section to be received within the hub portion 31 so that the cam member can be rotated.

In the position shown in FIGS. 1 and 2, the castor is in the self-tracking mode. The wheels 2 are free to rotate and the rod 25 is in its lowermost position with the end portion 52 of the channel centre web engaged in one of the slots on the underside of the flange 41. The slots are located so that engagement with the end portion 52 takes place in one of only two predetermined angular positions of the body with respect to the mounting structure in which the common wheel axis is at right angles to a predetermined direction of movement of the furniture article. When the rod 25 is initially moved into its lowermost position, the end portion 52 will not normally be in registration with one of the slots and until such position is reached the castor is able to swivel, the spring 42 urging the flange 41 against the end portion.

Rotation of the cam member 30 to raise the rod 25 against the spring 42 to disengage the flange 41 from the end portion 52 sets the castor body free to swivel on the mounting structure, the wheels 2 remaining free to turn on the body.

Rotation to the third angular position of the cam member 30, again raises the rod 25 so that the toothed end portion 50 of the brake arm 44 is engaged by the teeth on the upper side of the flange 41. Swivelling of the body is prevented and the brake arm 44 pivots upwardly, applying the brake pads 47 against the brake sleeves 9 of the wheels. The castor is then in the fully braked mode, being braked against wheel rotation and latched against swivelling. Wear of the brake pads 47 can be compensated by tightening of the bolt 45, with compression of the pad 49.

The modified castors of FIGS. 6 and 7 correspond to the castor of FIGS. 1–5 except as specified below, and one or more of the modifications can be incorporated in it.

In the modified castor shown in FIG. 6, the longitudinal movement of the rod 25 is effected not by rotation of a cam member, but by operation of a Bowden cable 55. A modified cap 56 of the housing 26 is tapped to receive an externally threaded sleeve by means of which the sheath of the Bowden cable is secured to the castor. The cable wire 57 extends through the sleeve and is connected to the upper end of the modified yoke 59.

The remainder of the castor of FIG. 6 is as shown an described with reference to FIGS. 1–5. It will be evident that the pin 25 can be longitudinally moved between the positions corresponding to the selftracking mode, the free mode, and the fully braked mode by appropriate extension of the Bowden cable from a remotely located operating lever or the like.

In the modified castor of FIG. 7, braking of the wheels is effected mechanically rather than frictionally, by engagement of teeth provided on the wheels and the braking arm respectively. Wheels 62 have the same general shape as the wheels 2 and include sleeves which are generally similar to the sleeves 9 but which are provided externally with axially extending teeth 65. A braking arm 66 has the same general configuration as the arm 44 but in place of the pads 47, it is provided with teeth 67 shaped to mesh with the wheel teeth 65 and extending over an arcuate portion of the arm subtending about 35° to the wheel axis. When the rod 25 is raised to engage the upper teeth on the flange 41 with the toothed end portion 50 of the arm and then raise the arm, the teeth 67 engage the teeth 65 to brake the wheels against rotation.

In place of the pad 49, the castor of FIG. 7 has a compression spring 69 received in a recess in the arm 66. To compensate for the loss of the resilience of the pads 47, the bolt 45 acts on the arm 66 by way of a resilient washer 70 through which the bolt shank extends.

The castor of FIG. 7 is further modified in that rotation of the rod 25 relative to the stem 16 is presented by a pin 71 projecting radially outwardly of the rod into an axially extending slot opening from the lower end of the stem.

Adjustment during assembly of the spacing of the yoke 34 and the rod 25 longitudinally of the mounting structure is effected by rotation of the housing 26 on the rod, the rod having a screw-threaded upper end portion 74 received in a tapped recess in the yoke. The pin 71 slides along the slot 72 to accommodate this adjustment.

The second castor embodying the invention, illustrated in FIGS. 7–10 comprises a body in the form of a fork 90 which can rotate in use on a mounting structure about a vertical axis. The fork 90 has generally triangular side webs 91 between which the single roller or wheel 92, provided with a tyre of rubber or other suitable material, is journalled in any suitable way. At the upper part of the fork 90, an apertured plate portion 94 is engaged between the ball bearings of an upper or primary bearing retained by a bearing case 95 and those of a lower or secondary bearing with a case 96. The bearings are located at the lower end of the mounting structure and the primary bearing is protected against the entry of dust, etc. by the depending skirt portion of a cover 97. The mounting structure above the bearings, and the rod 25 extending downwardly from it, correspond generally to FIGS. 1-5 and are therefore not further described.

Beneath the rear part of the plate portion 94 there is rivetted a latch plate 99 which extends downwardly and then forwardly to a free end portion 100 underlying a flange 101 projecting outwardly of a sleeve 102 secured to the lower end of the rod 25. The lower surface of the flange 101 is provided with diametrically opposed slots into which the latch plate end portion 100 can be received.

The flange 101 also has an upwardly converging frusto-conical upper surface provided with a multiplicity of radially extending teeth 104 distributed around it. Journalled on a transverse axis between the fork side webs 91, is a brake lever 105 having spaced side portions adjacent the fork side webs providing an aperture through which the latch plate 99 extends forwardly to the end portion 100. These side portions are joined at the forward end by a toothed portion 107 overlying and engageable with the teeth 104. At the rear end, the brake lever side plates are joined by a cross-piece to which a replaceable brake pad 109 is adjustably secured by a bolt 110 extending through the pad into a tapped hole in the cross piece.

The single wheeled castor of FIGS. 7–10 operates in much the same way as the castors of FIGS. 1–6. In the portion shown, the castor is in the self-tracking mode with the fork 90 latched against swivelling by engagement of the latch plate end portion 100 in one of the slots at the underside of the flange 101. The wheel 92 is free to rotate although the 109 lever 105 is gravitationally biassed so that the brake pad 109 bears lightly on the tyre of the wheel 92. Free swivelling is obtained by upward movement of the rod 25 to an intermediate position in which the flange 101 engages neither the end portion 100 nor the brake lever 105. The full braking mode is reached by further upward movement of the rod 25 to engage the toothed portion 107 by the teeth 104 and to pivot the lever 105 to urge the pad 109 against the wheel 92. By rotation of the bolt 110, the brake pad 109 can be released, moved to a lower position on the cross-piece, and again secured in place, so as to accommodate wear.

The single wheel castor of FIGS. 7–10 can be modified for remote operation, as by the arrangement shown in FIG. 6 and may incorporate the length adjustment arrangements of FIG. 7.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A castor comprising:
a body,
wheel means,
means rotatably mounting said wheel means on said body,
an elongate hollow mounting member,
means mounting said body on said mounting member for rotation about a substantially vertical axis spaced from said wheel rotatable means, and
brake means for braking said wheel means against rotation, said brake means comprising:
a brake member slidably guided in said hollow mounting member for movement downwardly along said substantially vertical axis to release said braking, and
brake member operating means carried by said mounting member and selectively operable to act on said brake member at the region of the upper end thereof to effect said movements of said brake member.

2. The castor of claim 1 wherein said brake member operating means comprises a camming mechanism.

3. The castor of claim 1 wherein said brake member operating means comprises a cable mechanism, said mechanism including a cable of which at least the lower portion extends substantially along said substantially vertical axis.

4. The castor of claim 1 wherein said brake means further comprises a braking lever, and means pivotably mounting said braking lever on said body, said braking lever being movable by said brake member into braking engagement with said wheel means.

5. The castor of claim 1 further comprising biassing means biassing said brake member against upward movement, and wherein said brake member operating means comprises a cam, means mounting said cam on said mounting member for rotation about a substantially horizontal axis, and a cam follower carried by said brake member at the upper end thereof, said cam follower being engaged with said cam.

6. The castor of claim 3 wherein said mounting member has an upper end portion carrying said cam mechanism and constructed as a housing comprising demountable wall portions.

7. The castor of claim 1 further comprising a spring biassing said brake member to move downwardly, and wherein said brake member operating means comprises a cable movable lengthwise within a sheath, said cable being connected to said brake member at the upper end thereof, and said sheath being connected to said mounting member.

8. The castor of claim 1 further comprising screw threaded means between upper and lower portions of said brake member for selective adjustment of the length thereof.

9. The castor of claim 2 wherein said braking lever is mounted on said body by screw-threaded adjustment means and wherein biassing means biasses said braking lever against said braking engagement.

10. The castor of claim 4 further comprising brake pad wherein said wheel means comprises a single wheel and said braking lever is pivotably mounted on said body between first and second ends of said braking lever, said first end being engageable by said operating member and said second end carrying said brake pad for frictionally engaging said wheel.

11. A castor comprising:
a body,
two wheels mounted on opposed sides of said body for rotation about a common axis, said wheels have sleeve portions between said common axis and the outer peripheries thereof,
means rotatably mounting said wheel means on said body,
an elongate hollow mounting member,
means mounting said body on said mounting member for rotation about a substantially vertical axis spaced from said wheel axis, and
brake means for braking said wheels against rotation, and brake means comprising:
an operating member slidably guided in said hollow mounting member for movement along said substantially vertical axis and being movable upwardly to exert a braking effect on said wheels, and
a braking lever movable by said operating member to brakingly engage the exteriors of said wheel sleeve portions.

12. The castor of claim 11 wherein said sleeve portions and said braking lever have thereon teeth interengageable to effect said braking.

13. A castor comprising:
a body,
wheel means,
means rotatably mounting said wheel means on said body,
an elongate hollow mounting member,
means mounting said body on said mounting member for rotation about a substantially vertical axis spaced from said wheel axis, and
brake means for braking said wheel means against rotation, said brake means comprising:
an operating member slidably guided in said hollow mounting member for movement along said substantially vertical axis and being movable upwardly to exert a braking effect on said wheel means,
a braking lever movable by said operating member into braking engagement with said wheel means,
screw-threaded adjustment means mounting said braking lever on said body, and
biassing means biassing said braking lever against said braking engagement.

14. A castor comprising:
a body,
wheel means,
means rotatably mounting said wheel means on said body,
an elongate hollow mounting member,
means mounting said body on said mounting member for rotation about a substantially vertical axis spaced from said wheel axis, and
brake means for braking said wheel means against rotation, said brake means comprising:
an operating member slidably guided in said hollow mounting member for movement along said substantially vertical axis and being movable upwardly to exert a braking effect on said wheel means,
a braking lever movable by said operating member with braking engagement with said wheel means,
means restraining said operating member against rotation relative to said mounting member, and
formations on said operating member and on said braking lever, said formations being co-operably engageable on said upward movement of the operating member to thereby prevent the rotation of said body about said substantially vertical axis.

15. A castor comprising:
a body,
wheel means,
means rotatably mounting said wheel means on said body,
a mounting member,
means mounting said body on said mounting member for rotation about a substantially vertical axis spaced from said wheel axis,
brake means for braking said wheel means against rotation, said brake means comprising an operating member movable upwardly to exert a braking effect on said wheel means, and
formations on said operating member and on said body, said formations being co-operably engageable on downward movement of said operating member to thereby hold said body in a predetermined angular relationship to said mounting member.

16. A castor comprising:
a body,
two wheels,
means mounting said wheels on said body for rotation about a substantially horizontal axis, each of said wheels having an outer rim and means defining an external cylinderical surface concentric with said substantially horizontal axis and located radially inwardly of said outer rim,
castor mounting means,
means mounting said body on said castor mounting means for swivelling about a substantially vertical axis spaced from said horizontal wheel axis,
a brake arm, said brake arm having two portions each adapted for braking engagement with a respective one of said cylindrical surfaces,
means mounting said brake arm on said body for pivotation between positions respectively of disengagement from said wheels and of braking engagement therewith,
an elongate operating member, said brake arm portions being located on said brake arm between said operating member and said brake arm mounting means,
means guiding said elongate operating member on said castor mounting means for movement along said substantially vertical axis from a non-braking position to a position in which said operating member acts on said brake arm to cause said braking engagement of said brake arm, said operating member movement being in the upward direction.

17. A castor comprising:
a body,
wheel means,
means mounting said wheel means on said body for rotation about a substantially horizontal axis,
castor mounting means,
means mounting said body on said castor mounting means for swivelling about a substantially vertical axis spaced from said horizontal wheel axis,
a brake arm,
means mounting said brake arm to said body for pivotation between positions respectively for disengagement from said wheels and of braking engagement therewith,
an elongate operating member,
means guiding said elongate operating member on said castor mounting means for movement along said substantially vertical axis from a non-braking position to a position in which said operating member acts on said brake arm to cause said braking engagement of said brake arm, said operating member movement being in the upward direction,
means restraining said operating member and said mounting means against relative rotation about said substantially vertical axis,
an upwardly facing surface on said operating member with a series of teeth extending radially of said vertical axis formed on said upwardly facing surface, and
a tooth formed on an end portion of said brake arm, said tooth being engageable with said brake arm, thereby preventing said swivelling of said body on said mounting means.

18. A castor comprising:
a body,
wheel means,
means mounting said wheel means on said body for rotation about a substantially horizontal axis,
castor mounting means,
means mounting said body on said castor mounting means for swivelling about a substantially vertical axis spaced from said horizontal wheel axis,
a brake arm,
means mounting said brake arm on said body for pivotation between positions respectively of disengagement from said wheels and of braking engagement therewith,
an elongate operating member,
means guiding said elongate operating member on said castor mounting means for movement along said substantially vertical axis from a non-braking position to a position in which said operating member acts on said brake arm to cause said braking engagement of said brake arm, said operating member movement being in the upward direction,
operating member drive means, said operating member comprises yoke means receiving a drive for said operating member from said drive means,
a brake arm actuating element aligned with said yoke means and engageable with said brake arm, and
screw-threaded means between said yoke means and said actuating element permitting adjustment of the length of said operating element effective between said drive means and said brake arm.

* * * * *